2,802,729
RECOVERY OF MANGANESE VALUES FROM METALLURGICAL SLAGS AND TAILINGS

Hugh S. Cooper, Shaker Heights, Ohio, assignor to Walter M. Weil, Cleveland, Ohio No Drawing. Application June 26, 1953, Serial No. 364,499

4 Claims. (Cl. 75—24)

This invention relates to the recovery of ferromanganese from metallurgical slags and tailings in which manganese and iron are present as oxides in combination with silicon dioxide, calcium oxide, aluminum oxide, magnesium oxide, and other minerals.

Metallurgical slags and tailings and low-grade ores containing manganese and iron oxides in combination with various other minerals have heretofore been smelted in the presence of carbon at temperatures around 1400°–1500° C. to reduce the manganese and iron to a molten metallic form, the molten metal collecting at the bottom of the heated mass and the major portion of the other minerals present accumulating above the molten metal as a slag. While this operation is capable of separating a portion of the manganese and iron as a ferromanganese alloy, considerable amounts of both of these metals, and particularly of the manganese, remained unrecoverable in the slag or were otherwise lost. If the raw material contained substantial amounts of silica, the ferromanganese alloy resulting from the operation had an undesirably high silicon content. Also, clean separation of the metal from the slag was difficult to obtain, and the ferromanganese recovered was contaminated with unreduced oxides to an objectionable degree, which greatly reduced the value and utility of the product. Moreover, the reduction operation was relatively slow and, therefore, unduly expensive to employ in commercial operations.

The object of the present invention is to improve the prior process of recovering ferromanganese from metallurgical slags and tailings and the like so as to obtain a cleaner separation of the ferromanganese, to increase the purity of the ferromanganese product, and to increase the general efficiency of the operation.

In accordance with the invention, the material to be treated, which may contain enough carbon to serve as the sole reducing agent in the prior processes, is heated in a suitable furnace to a temperature of about 1400°–1500° C. in an atmosphere of hydrogen. In the presence of the hydrogen atmosphere the manganese and iron oxides are more completely reduced and melted, and a clean separation of the reduced molten ferromanganese occurs. Substantially all of the other minerals with only minor amounts of unreduced manganese and iron oxides remain in the slag, and the molten ferromanganese may be tapped off from the furnace substantially free from slag and containing, other than carbon, only minute amounts of impurities. The reduction takes place rapidly and efficiently, and the product is admirably suited for further treatment to remove the carbon and unwanted amounts of iron and to produce, as a final commercial product, either pure manganese or a ferromanganese having a desired manganese-to-iron ratio.

Though forming no part of the present invention, this subsequent treatment preferably involves selective chloridization of the iron and manganese components of the ferromanganese alloy in that order and separate collection of the resulting iron and manganese chlorides in an anhydrous form in suitable condensers. The condensed anhydrous chlorides are substantially free from carbon and other impurities and may be separately electrolyzed in a fused salt bath to produce substantially pure manganese powder and substantially pure iron powder. Alternatively if desired, the manganese chloride and any desired amount of the iron chloride may be condensed together or otherwise mixed and electrolyzed together to produce a substantially pure ferromanganese having any desired ratio of manganese to iron. These subsequent treatments are the subject of my co-pending application, Serial No. 265,395, filed January 8, 1952, now Patent No. 2,752,299, for Production of Manganese and Ferromanganese, and a preferred, fused bath, electrolysis process and apparatus are the subject of my co-pending application, Serial No. 214,988, filed March 10, 1951, now abandoned, for Fused Bath Electrolysis of Metal Chlorides.

One of the difficulties with the prior process for reducing the manganese and iron with carbon was the tendency for a substantial amount of silicon dioxide to be reduced and the silicon to be dissolved in the ferromanganese product. By means of the process of the present invention, the amount of silicon in the product is kept below 0.5% and generally below 0.2%.

Without the use of the hydrogen atmosphere, much of the manganese in the original raw material is lost with the slag, either because it is not entirely reduced under the conditions of separation, or because the molten reduced metal is not sufficiently fluid to flow through the mass efficiently and is trapped therein in substantial amount. By employing the hydrogen atmosphere, however, a substantially sharper and more efficient separation of the molten manganese from the slag occurs, possibly because of greater fluidity of the molten metal, and a substantially higher recovery of manganese results.

The invention will be better understood from the following example which is given by way of illustration:

Example

The raw material treated consisted of the tailings resulting from the recovery of zinc from zinc ores, and the tailings had approximately the following composition by weight:

|  | Percent |
|---|---|
| Iron | 17.1 |
| Manganese | 9.5 |
| Silica | 18.4 |
| Calcium oxide | 21.1 |
| Calcium carbonate | 4.4 |
| Aluminum oxide | 4.4 |
| Magnesium oxide | 2.6 |
| Zinc | 1.1 |
| Sulphur | 0.3 |
| Phosphorus | 0.03 |
| Carbon | 9.8 |
| Undetermined | 11.27 |
|  | 100.00 |

An electric furnace was charged with the tailings, and a stream of hydrogen gas was introduced into the furnace to maintain substantially a hydrogen atmosphere while heating the charge to a temperature in the range of about 1450°–1500° C. The gaseous products formed by the reduction of manganese and iron, together with excess hydrogen, were withdrawn through the furnace flue for recovery of volatile components such as zinc and sulphur, and replacement hydrogen was bled into the furnace continuously during the run in sufficient quantity to insure the maintenance of a hydrogen atmosphere substantially free from significant amounts of oxidizing gases. After about three hours at the specified temperature, the furnace was tapped, and the molten ferromanganese was drained off and cast into ingots.

About 80 to 85% of the manganese in the original charge has been recovered in this manner in the form of an alloy consisting of 28.5% manganese and 4.9% carbon by weight, the balance being substantially all iron. The total additional impurities ran about 0.5%, of which only about 0.2% was silicon.

From the foregoing, it will be appreciated that this invention provides a most efficient and simple process for recovering a high percentage of the manganese from metallurgical slags and tailings of the type described. It will also be noted that the resulting ferromanganese alloy is substantially free from impurities other than carbon, as a result of an unusually clean separation of the alloy and the slag and as a result of the apparent high selectivity of the reduction operation.

Having described my invention, I claim:

1. The process of recovering ferromanganese from metallurgical slags and tailings containing mixtures of the oxides of manganese, iron, silicon, calcium, aluminum, and magnesium, with other minerals, wherein said oxides of silicon, calcium, aluminum, and magnesium constitute at least substantially half of the mixture, comprising heating a charge consisting essentially of such a mixture in a furnace to a temperature in the range of about 1350° to 1500° C. in an atmosphere consisting essentially of hydrogen until a molten pool of substantially silicon-free ferromanganese is formed below the remaining charge.

2. The process of recovering ferromanganese from metallurgical slags and tailings containing mixtures of the oxides of manganese, iron, silicon, calcium, aluminum, and magnesium, with other minerals, wherein said oxides of silicon, calcium, aluminum, and magnesium constitute at least substantially half of the mixture, comprising heating a charge consisting essentially of such a mixture in a furnace to a temperature in the range of about 1350° to 1500° C. in an atmosphere consisting essentially of hydrogen until a molten pool of substantially silicon-free ferromanganese is formed below the remaining charge, and tapping off said molten ferromanganese.

3. The process of recovering ferromanganese from metallurgical slags and tailings containing mixtures of the oxides of manganese, iron, silicon, calcium, aluminum, and magnesium with carbon and other minerals, wherein said oxides of silicon, calcium, aluminum, and magnesium constitute at least substantially half of the mixture, comprising heating a charge consisting essentially of such a mixture in a furnace to a temperature in the range of about 1350° to 1500° C. in an atmosphere consisting essentially of hydrogen until a molten pool of substantially silicon-free ferromanganese is formed below the remaining charge.

4. The process of recovering ferromanganese from metallurgical slags and tailings containing mixtures of the oxides of manganese, iron, silicon, calcium, aluminum, and magnesium with carbon and other minerals, wherein said oxides of silicon, calcium, aluminum, and magnesium constitute at least substantially half of the mixture, comprising heating a charge consisting essentially of such a mixture in a furnace to a temperature in the range of about 1350° to 1500° C. in an atmosphere consisting essentially of hydrogen until a molten pool of substantially silicon-free ferromanganese is formed below the remaining charge, and tapping off said molten ferromanganese.

References Cited in the file of this patent
UNITED STATES PATENTS

| | | |
|---|---|---|
| 1,167,016 | Pratt | Jan. 4, 1916 |
| 1,768,622 | Madorsky | July 1, 1930 |
| 2,310,258 | Riveroll | Feb. 9, 1943 |
| 2,471,562 | Fitterer | May 31, 1949 |
| 2,709,131 | Marshall | May 24, 1955 |